US012783706B2

(12) United States Patent
Li et al.

(10) Patent No.: US 12,783,706 B2
(45) Date of Patent: Nov. 3, 2026

(54) TOKENIZED DATA CONTROL AND ACCESS MONITORING

(71) Applicant: Capital One Services, LLC, McLean, VA (US)

(72) Inventors: Bryan Li, Chicago, IL (US); Sushil Kumar Chaudhary, Glen Allen, VA (US); Ashish Sudhir Kulkarni, Brush Prairie, WA (US)

(73) Assignee: Capital One Services, LLC, McLean, VA (US)

( * ) Notice: Subject to any disclaimer, the term of this patent is extended or adjusted under 35 U.S.C. 154(b) by 36 days.

(21) Appl. No.: 18/884,481

(22) Filed: Sep. 13, 2024

(65) Prior Publication Data

US 2026/0080079 A1 Mar. 19, 2026

(51) Int. Cl.
*G06F 21/62* (2013.01)

(52) U.S. Cl.
CPC ...... *G06F 21/6218* (2013.01); *G06F 21/6245* (2013.01)

(58) Field of Classification Search
CPC ............. G06F 21/6245; G06F 21/6218; G06F 21/6227; G06F 21/6254; G06Q 50/265; H04L 9/0643
See application file for complete search history.

(56) References Cited

U.S. PATENT DOCUMENTS 6,829,594 B1 * 12/2004 Kitamura ............... G06Q 30/06 705/64
8,458,487 B1 * 6/2013 Palgon .................... G06F 21/00 713/193
9,906,523 B2 * 2/2018 Mattsson ............ G06F 16/2455
10,049,227 B1 * 8/2018 Sampson ............ G06F 21/6218
10,608,997 B1 * 3/2020 Sethi ...................... H04L 63/123
10,936,738 B1 * 3/2021 Roberts ............... H04L 63/0428
11,449,627 B2 * 9/2022 Bayon ................. G06F 11/1464
11,537,737 B2 * 12/2022 Koduru ............... G06F 21/6227
2009/0249082 A1 * 10/2009 Mattsson ............... G06Q 20/40 713/193
2011/0154467 A1 * 6/2011 Bomar .................. G06F 21/335 726/9

(Continued)

OTHER PUBLICATIONS

Florin Ogigau-Neamtiu, "Tokenization as a Data Security Technique", 2016, Zeszyty Naukowe AON nr 2 (103) 2016 (Year: 2016).*

(Continued)

*Primary Examiner* — Zhimei Zhu
(74) *Attorney, Agent, or Firm* — Banner & Witcoff, Ltd.

(57) ABSTRACT

Systems, methods, and apparatuses are described for limiting and tracking access to tokenized data. A computing device may store tokenized data elements along with original versions of those data elements. Responsive to user requests, the tokenized data elements may be provided to users. This process may be performed such that the original values are not transmitted and/or otherwise available to the user. Responsive to subsequent user requests for original forms of those tokenized data elements, the computing device may validate permissions and display the original value of tokenized data elements. Access to such original values may be logged, and unusual patterns of access to those tokenized data elements may cause notifications to be output.

20 Claims, 5 Drawing Sheets

400

| Token | Original Value | Category | |
|---|---|---|---|
| a7c2HJJl | 123-456-789 | Social Security Number | 401 |
| | E-Mail | Messaging Preference | 402 |
| 1111-1111-1111-1111 | 1234-5678-9101-1121 | Credit Card Number | 403 |

(56) References Cited

U.S. PATENT DOCUMENTS

| | | | | |
|---|---|---|---|---|
| 2012/0046972 | A1* | 2/2012 | Tonti | G16H 40/67 705/3 |
| 2014/0177825 | A1* | 6/2014 | Mattsson | H04L 9/06 380/28 |
| 2015/0067881 | A1* | 3/2015 | Badstieber | G06F 16/13 726/26 |
| 2016/0085987 | A1* | 3/2016 | Kaliski, Jr. | G06F 21/6218 707/694 |
| 2017/0147829 | A1* | 5/2017 | Cismas | G06F 21/604 |
| 2017/0262659 | A1* | 9/2017 | Kuris | G06F 21/6227 |
| 2018/0145963 | A1* | 5/2018 | Mattsson | G06F 21/6254 |
| 2020/0057864 | A1* | 2/2020 | Parthasarathy | G06F 16/24578 |
| 2020/0327252 | A1* | 10/2020 | Mcfall | G06F 21/6254 |
| 2021/0004373 | A1* | 1/2021 | Sankaran | G06F 16/2468 |
| 2021/0256149 | A1* | 8/2021 | Koduru | G06F 21/6254 |
| 2022/0131844 | A1* | 4/2022 | Sherlock | H04L 63/105 |
| 2023/0237194 | A1* | 7/2023 | Watkins | H04L 63/10 726/26 |
| 2023/0289464 | A1* | 9/2023 | Niu | G06F 21/6227 |
| 2024/0232422 | A1 | 7/2024 | Koduru et al. | |
| 2024/0346164 | A1* | 10/2024 | Trotta | G06F 21/6218 |
| 2024/0364747 | A1* | 10/2024 | Gilburd | G06F 21/6218 |
| 2024/0378318 | A1* | 11/2024 | Dange | G06F 21/32 |
| 2025/0307442 | A1* | 10/2025 | Evangelista | G06F 21/6218 |
| 2025/0328678 | A1* | 10/2025 | Harris, Jr. | G06F 21/6245 |

OTHER PUBLICATIONS

B. Liver and K. Tice, "Privacy Application Infrastructure: Confidential Data Masking," 2009 IEEE Conference on Commerce and Enterprise Computing, Vienna, Austria, 2009, pp. 324-332 (Year: 2009).*

Oct. 20, 2025—(WO) International Search Report and Written Opinion—App No. PCT/US2025/041742.

Tokenization, "What is Tokenization," imperva, data of first publication unknown but, prior to Jun. 30, 2024, 5 pages.

Oct. 18, 2023, Dr. Trupti Rane, Data Tokenization Base Practices: A Guide to Protect Sensitive Data, Fortanix, 6 pages.

* cited by examiner

300

400

| Token | Original Value | Category | |
|---|---|---|---|
| a7c2HJJI | 123-456-789 | Social Security Number | 401 |
| | E-Mail | Messaging Preference | 402 |
| 1111-1111-1111-1111 | 1234-5678-9101-1121 | Credit Card Number | 403 |

FIG. 4

500

| Access Record | User | Time | |
|---|---|---|---|
| Credit Card Number | User01 | Monday | 501 |
| E-mail Address | User02 | Monday | 502 |
| Credit Card Number | User01 | Monday | 503 |
| Credit Card Number | User01 | Tuesday | 504 |

FIG. 5

TOKENIZED DATA CONTROL AND ACCESS MONITORING

FIELD OF USE

Aspects of the disclosure relate generally to data storage, transmission, and security. More particularly, aspects described herein describe a process for storing tokenized data, tracking access to that data, and protecting against unauthorized use of that data.

BACKGROUND

Sensitive data, such as Personally Identifiable Information (PII), medical record data, and the like, may be stored in a tokenized format to protect it from unauthorized access. Such a tokenization process may comprise associating some original data (e.g., a credit card number, like "1234-5678-9101-1121") with a token (e.g., "Credit Card 2x5o911") that represents that data. Tokens might be generated randomly and/or using one-way functions such that the token cannot be used to recreate the original data without access to the tokenization system itself (e.g., without access to the mappings between the token(s) and the corresponding original values of those token(s)). In this manner, an additional layer of protection may be provided to the original data. In some cases, such tokenization processes may thereby act as a replacement to encryption where, for instance, there is a concern that future technological developments may result in computer processing power that allow for the reversal of encryption algorithms. After all, there may someday be a point in which computing devices become powerful enough to brute force through all possible permutations of an encryption algorithm—that said, such computing power would not, standing alone, enable the reverse engineering of a given token.

Though tokenization can improve security, there are many issues with many organizations' implementation of tokenization. In some circumstances, the original forms of tokenized data may be transmitted to applications along with the tokens itself, meaning that the tokenization is often meaningless in terms of security because the original value of the token might be determined by, for example, inspecting packets to/from the application. In other circumstances, because tokenization systems are fairly rudimentary (e.g., responding with original values when queried with a token), it can be all but impossible to ascertain when tokenization systems are being abused to, for example, collect PII for unauthorized purposes.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein relate to limiting and tracking access to tokenized data. A computing device may be configured to store tokenized forms of original data as associated with that original data. For example, the computing device may have access to (e.g., manage) a database that stores original data (e.g., credit card numbers, social security numbers) and tokenized values of that original data (e.g., random, non-deterministic strings which uniquely represent the original data). The computing device may receive a request for data (e.g., a customer profile), and return the tokenized data (e.g., a version of the customer profile including tokenized data along with other data that need not be tokenized). In this manner, the default operation of the computing device may be to provide tokenized data if available, meaning that the original data safely remains in the database and unavailable to the user(s). That said, upon a request for an original value of some token (e.g., a request for a real credit card number, not just the token representing that credit card number), the computing device may send such a tokenized value upon confirming that the requesting user and/or user device have adequate permissions to access such a value. Moreover, as part of sending that original value, the computing device may log access to the original value. Then, the logs indicating access to the original forms of tokenized data may be processed to identify patterns of access to data of various categories, which may indicate patterns of unauthorized access. For instance, if the logs indicate that various users are all suddenly requesting a large number of the original value of tokenized credit card numbers, such a pattern might indicate an attempt to exfiltrate data (e.g., steal a large quantity of credit card numbers using compromised user accounts).

More particularly, a computing device may, based on determining that a first data element is associated with a security level that satisfies a threshold, store, in a database, a tokenized first data element generated by tokenizing the first data element. That first data element may be associated with a first data category. The computing device may receive, from a user device, a request for data comprising the first data element and a second data element. In that example, the second data element may be associated with a second data category different from the first data category. Then, the computing device may cause display, on a user interface of the user device and in response to the request for data, of the tokenized first data element and the second data element by transmitting, to the user device, the tokenized first data element and the second data element. Later, the computing device may receive, from the user device, a request for an original value of the tokenized first data element. For example, the computing device may receive the request for the original value of the tokenized first data element in response to the user of the user device interacting with the tokenized first data element in the user interface. The computing device may then, based on the request for the original value of the tokenized first data element and based on determining that a user of the user device has adequate permissions to access the original value of the tokenized first data element, cause display, on the user interface of the user device, of the original value of the tokenized first data element and the second data element by transmitting second data comprising the original value of the tokenized first data element and the second data element. The computing device may also generate a log entry that reflects access, by the user and the user device, to the original value of the tokenized first data element. Then, the computing device may, based on the log entry and one or more other log entries corresponding to the first data category, cause output of a notification that indicates a pattern of access to the first data category. Those one or more other log entries may correspond to access, to data corresponding to the first data category, by one or more second users of one or more second user devices.

The output of the notification may be related to a wide variety of security-related concerns. In some cases, the pattern of access may relate to an increase in access to a certain type of data. For example, the computing device may determine, based on the log entry and the one or more other log entries, an increase in access to data of the first data category. In that example, the notification may indicate the increase in access to data of the first data category. In some cases, the pattern of access may relate to users exceeding access limits associated with certain data. For example, the computing device may determine, based on a permissions level corresponding to the user of the user device, an access limit, for the user, corresponding to the first data category and then determine, based on the log entry and the one or more other log entries, that the user exceeded the access limit. In that example, the notification may indicate that the user exceeded the access limit.

The tokenized data may be tokenized in a variety of different ways. In some cases, the computing device may tokenize data using different algorithms based on the category of data. For example, the computing device may determine a tokenization algorithm corresponding to the first data category and then generate the tokenized first data element by processing the first data element in accordance with the tokenization algorithm.

Logging may be performed even when a user is denied access to an original version of tokenized data. For example, the computing device may receive, from the user device, a request for an original value of a tokenized third data element. That tokenized third data element may be associated with a first data category. Then, based on determining that the user of the user device does not have adequate permissions to access the original value of the tokenized first data element, the computing device may generate a second log entry that reflects attempted access, by the user and the user device, to the original value of the tokenized third data element.

Corresponding methods, apparatus, systems, and non-transitory computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 4 depicts a database indicating tokens and corresponding original values for different types of data categories.

FIG. 5 depicts an access log for tokenized data.

DETAILED DESCRIPTION

Figure 1:
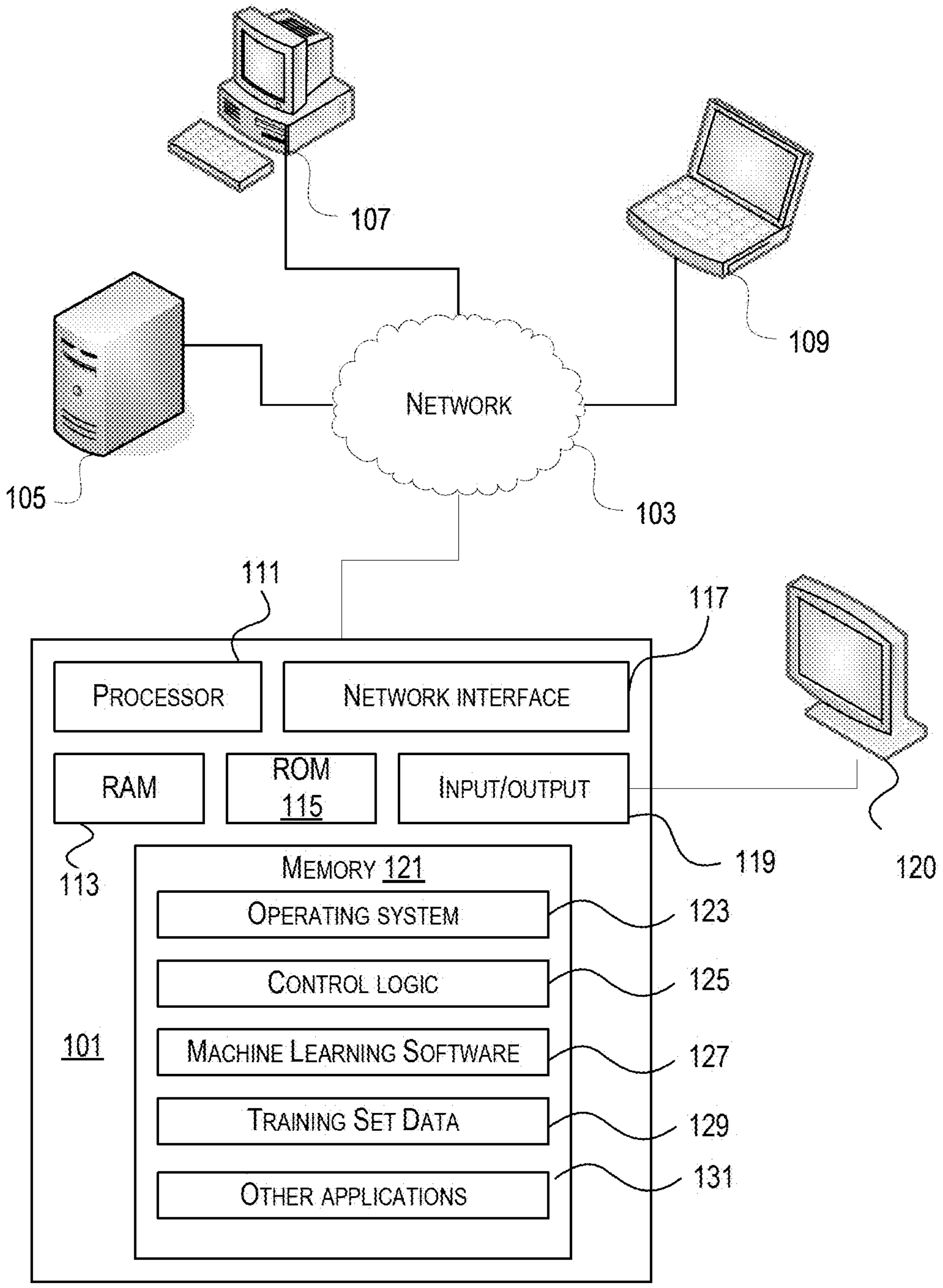
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, data tokenization can improve the privacy of data by replacing original versions of that data with representations of the data; however, present applications of such tokenization processes have numerous limitations. For example, many tokenization processes improperly transmit tokenized data along with the original forms of that data, which has numerous flaws: such transmissions can be abused to reveal the real identity of the data, and repeated such transmissions can be used by malicious parties to discern (if possible) the nature of the tokenization scheme/algorithm used. Put more generally, transmitting original values along with tokenized versions of those values and trusting users'devices to only display/use original values when necessary can defeat the purpose of tokenization in the first place. More broadly, such tokenization processes do not allow organizations to properly track access to the original forms of tokenized data, meaning that it can be hard to detect when tokenization systems are being abused to, for example, maliciously collect sensitive information. As a result, while tokenization has numerous benefits (e.g., when properly maintained, it can be more secure than encryption because encryption is often vulnerable to brute forcing and similar attacks), modern utilizations of tokenization are often undesirably insecure.

To remedy these and other issues, aspects described herein implement a tokenization scheme whereby individual data elements (not large swaths of data) are tokenized based on their data category and where original, untokenized versions of those individual data elements are selectively made available to users upon request. In this manner, when users request data (e.g., a profile of a customer), they might receive a response that comprises untokenized data (e.g., relatively simple/non-PII aspects of the customer profile, such as the customer's account identifier) and tokenized data (e.g., more sensitive data such as the customer's name, address, credit card number). The user might then be required to selectively request detokenization of tokenized elements, rather than receiving all of the detokenized data at once. For example, in the customer profile example referenced above, a user might have to click and separately manually request detokenization of each of the customer's name, address, and credit card number. This process may be augmented by a logging system which allows for the monitoring of access to original forms of tokenized data in various categories, which allows organizations to better understand access to sensitive data (and, in turn, identify when such access might be malicious and/or otherwise undesirable). For example, if an organization suddenly sees an uptick in requests for the detokenized versions of credit card numbers (but not, for example, other forms of data, such as customer addresses), this might be indicative of a malicious attempt to exfiltrate such numbers from the system.

Aspects described herein improve the functioning of computers by improving the security of data storage, transmission, logging, and the like. As described above, tokenization is a useful way to protect the security of data; however, modern implementations of tokenization have many flaws that risk the security of the data. For example, many tokenization systems transmit tokenized data along with the original form of that data at the same time (risking compromise of that data and compromise of tokenization algorithm(s)), tokenization systems are premised on the tokenization of large swaths of different types of data (meaning that detokenization must occur for all of the data, meaning that requests for some subset of the data can risk the entire corpus of the data), and tokenization systems are generally no more than simple Application Programming Interfaces (APIs) that return original data when prompted with tokens (or vice versa), meaning that tracking access to original forms of tokenized data can be extremely difficult. To remedy these and other issues, aspects described herein configure computing devices and similar hardware to (among other things) tokenize data in a more fine-grained manner, track access to the original forms of that data, and to identify circumstances when such access might be malicious. In some circumstances, the identification of malicious patterns of access may be performed using a machine learning model. As a result, computing devices (and the data stored thereon) are made significantly more secure. In turn, aspects described herein are a fundamentally computer-oriented solution to a problem unique to computers. No quantity of human beings could implement the processes herein, mentally or otherwise: after all, the issues described herein are fundamentally related to computing device data storage and security issues, in some instances involve machine learning techniques, and the processes herein necessarily involve one or more computing devices (e.g., one computing device to manage the database of tokenized elements and output notifications based on access patterns, and in some instances another computing device to request, receive, and/or display tokenized data elements).

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, computing devices 101, 105, 107, 109, and others may operate in concert to provide parallel computing features in support of the operation of control logic 125 and/or machine learning software 127.

FIG. 1 also shows that the computing device 101 may comprise a Hardware Security Module (HSM) 132 and/or a Quantum Random Number Generator (QRNG) 133. The HSM 132 may comprise any computing module (e.g., one or more computer chips, attached cards, or the like) which may be capable of managing secrets, performing encryption and/or decryption, and/or otherwise performing security- and/or authentication-related functions. The HSM 132 may comprise, for instance, one or more secure cryptoprocessor chips which are capable of performing cryptographic operations. The QRNG 133 may comprise any computing module (e.g., one or more computer chips, attached cards, or the like) capable of generating a random number. Such a random number might be generated using quantum methods which permit the random number to have a high degree of entropy.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
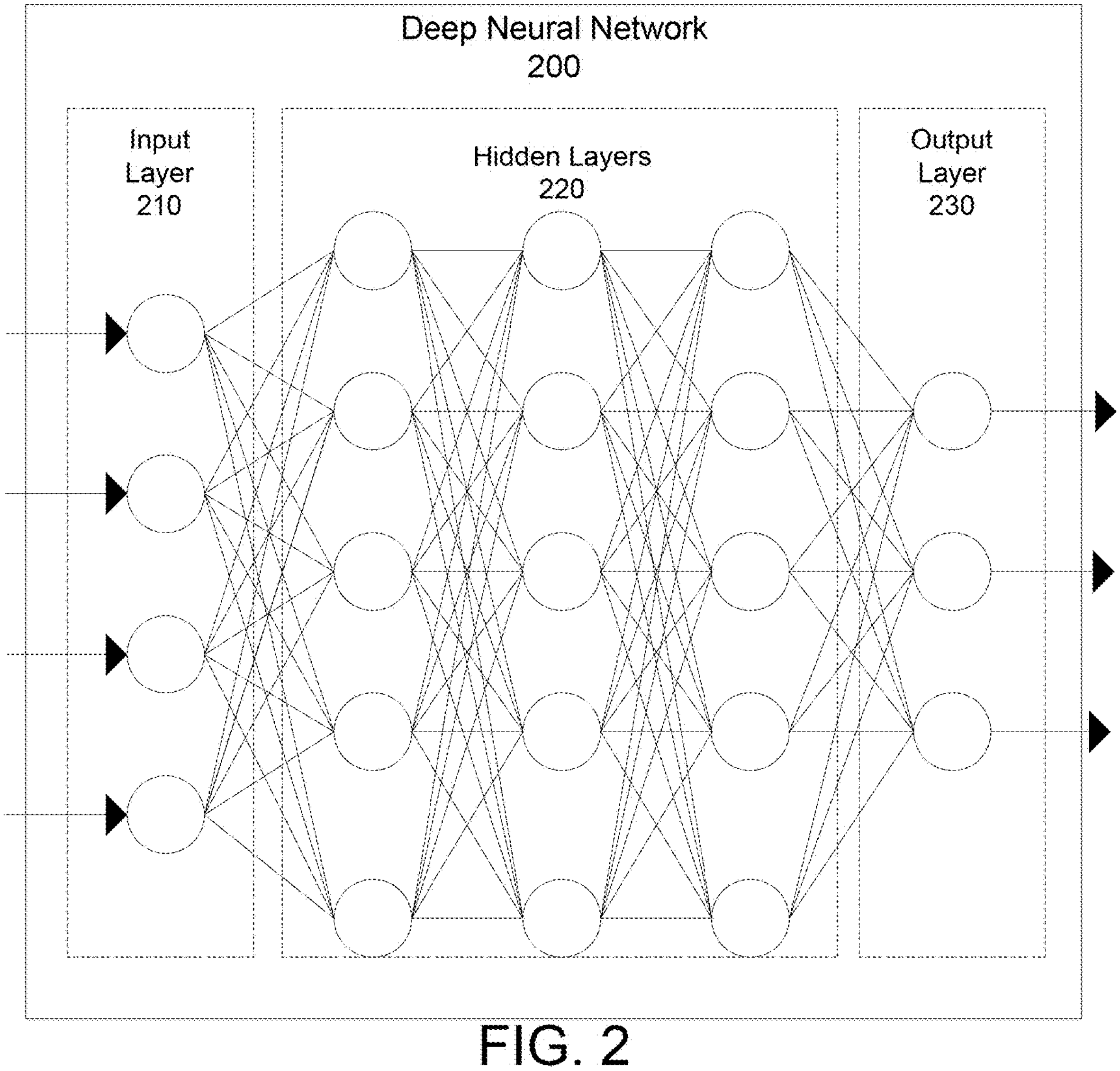
FIG. 2 depicts an example deep neural network architecture for a model according to one or more aspects of the disclosure

FIG. 2 illustrates an example of a deep neural network architecture 200. Such a deep neural network architecture may be all or portions of the machine learning software 127 shown in FIG. 1. That said, the architecture depicted in FIG. 2 need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network architecture 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
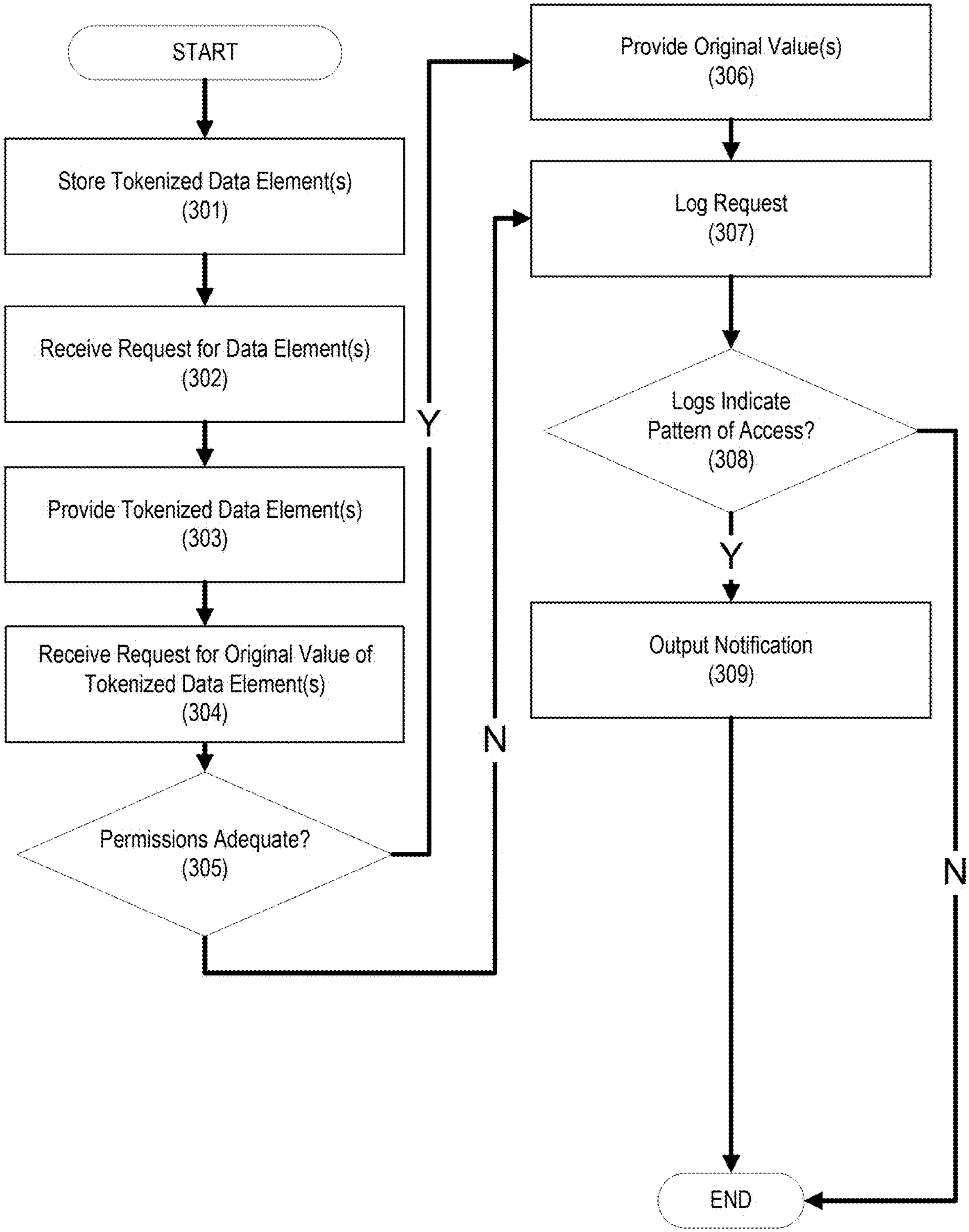
FIG. 3 depicts a method comprising steps for limiting and tracking access to tokenized data.

FIG. 3 depicts a method 300 comprising steps for limiting and tracking access to tokenized data which may be performed by a computing device, such as any one of the devices described with respect to FIG. 1 and/or FIG. 2. The steps shown in FIG. 3 are illustrative, and may be rearranged, omitted, and/or modified as desired. A computing device may comprise one or more processors and memory storing instructions that, when executed by the one or more processors, cause the performance of one or more of the steps depicted in FIG. 3. One or more non-transitory computer-readable media may store instructions that, when executed, cause the performance of one or more of the steps depicted in FIG. 3.

In step 301, a computing device may store tokenized data elements. This process may comprise storing, in a database, associations between data (e.g., names, addresses, credit card numbers, social security numbers) with tokenized forms of that data (e.g., arbitrary strings which represent that data). For example, the computing device may, based on determining that a first data element is associated with a security level that satisfies a threshold, store, in a database, a tokenized first data element generated by tokenizing the first data element. An example of a table that might be stored in such a database is discussed below with respect to FIG. 4.

A tokenization of data may be any representation of that data, and need not be the same or similar to the data itself. For instance, an address of an individual (e.g., "1234 Main Street, City State 00000") might be represented by a relatively shorter token (e.g., "0a9z82"). Tokens may be, but need not be, unique and/or deterministically generated using a particular algorithm. For instance, it may be desirable for tokens to be unique and deterministic where they are used for the purposes of training a machine learning model, such as that described above with respect to FIG. 2, as that way the machine learning model may be trained to make inferences based on the content of the token. As another example, there may be circumstances where it is desirable for tokens to be non-unique and non-deterministic, such as where security is improved by ensuring that a single token cannot be linked back to a particular individual or organization by reverse engineering an algorithm. In either case, tokens may be generated using algorithms, such as one-way algorithms configured to use one or more rules to convert a first string (e.g., "1234 Main Street, City State 00000") into a second string (e.g., as illustrated above, "0a9z82").

Not all data need be tokenized. For example, a set of data (e.g., a customer profile) may comprise data to be tokenized (e.g., sensitive data such as addresses, social security numbers) and data that need not be tokenized (e.g., relatively innocuous data such as the time the customer last logged in to a website). In turn, requests for a set of data (e.g., a customer profile) might comprise a request for both tokenized and untokenized data. Broadly, such requests may be responded to by providing both tokenized data (when it exists) and, for data that was not tokenized (e.g., because it is not sensitive), original data. In this manner, the computing device may default to providing tokenized data when it exists, but not all data need be tokenized.

Different data may be tokenized in different ways based on a category of the data. For example, the computing device may determine a tokenization algorithm corresponding to the first data category and then generate the tokenized first data element by processing the first data element in accordance with the tokenization algorithm. In this manner, certain types of data (e.g., highly sensitive data, such as social security numbers) may be tokenized using different methods than other types of data (e.g., less sensitive data, such as zip codes). One benefit of this approach is that more secure but computationally intensive tokenization algorithms may be selectively used to protect highly sensitive data but that those algorithms (which might be more computationally involved and thus slower) might not be used for all stored data. Another benefit of this approach is that it can limit the risk of a tokenization algorithm being leaked or otherwise known by a malicious party: even if one tokenization algorithm is compromised by a security breach, leak, or the like, other tokenization algorithms may still be uncompromised.

In step 302, the computing device may receive a request for one or more of the tokenized data elements. Such a request may comprise a request for some set of data (e.g., a customer profile) that contains portions of data that might be tokenized (e.g., credit card numbers) and portions of data that need not be tokenized (e.g., an indication of whether the customer prefers e-mail or text messages). For example, the computing device may receive, from a user device, a request for data comprising the first data element and a second data element. That second data element may be associated with a second data category different from the first data category. In such an example, the second data element may, but need not be, tokenized.

In step 303, the computing device may provide the one or more tokenized data elements. Providing the one or more tokenized data elements may comprise responding to the request for the one or more tokenized data elements with the one or more tokenized data elements and (where applicable, such as where a user has asked for a set of data like a customer profile) data that is not tokenized. For example, the computing device may cause display, on a user interface of the user device and in response to the request for data, of the tokenized first data element and the second data element by transmitting, to the user device, the tokenized first data element and the second data element.

One benefit to the approach taken in step 303 is that users might be provided sufficient data to avoid unnecessary detokenization of tokenized data. Many existing tokenization systems tokenize data (e.g., customer profiles) in the aggregate, meaning that relatively innocuous data (e.g., the customer's last login date) is tokenized along with and using the same tokenization algorithm as more sensitive data (e.g., the customer's phone number). The process described herein may be different in that, because data is individually tokenized, the response to a request can include tokenized and untokenized data, and tokenized data may be detokenized only when needed. For instance, in response to a request for a customer profile, tokenized data (e.g., a tokenized form of a phone number) and plain data (e.g., the customer's last login date) may be transmitted. As will be described later, a token may be detokenized when a user specifically requests detokenization of the token, but need not be detokenized as part of trying to access other data. This may lower the frequency of detokenization of some categories of data: for example, in the aforementioned example, if a user simply wants to check the customer's last login date, the user can do so without detokenizing and causing transmission of the customer's phone number.

Another benefit of the approach taken in step 303 is that it avoids transmission of the original form of tokenized data until absolutely necessary. Assume, for instance, that an organization's network is compromised. In such an example, it may be beneficial to, where possible, avoid the unnecessary transmission of the original form of tokenized data until absolutely necessary (e.g., in response to a specific request for that data). Otherwise, the data may be more likely to be captured through packet sniffing or similar techniques.

In step 304, the computing device may receive a request for an original value of one or more of the tokenized data elements. For example, the computing device may receive, from the user device, a request for an original value of the tokenized first data element. In some circumstances, this request may be associated with interaction, by a user, with a user interface element corresponding to the tokenized data element(s). For example, the computing device may receive the request for the original value of the tokenized first data element in response to the user of the user device interacting with the tokenized first data element in the user interface. This may be effectuated by, for example, a user clicking on the tokenized first data element, using a menu to request that a certain type of data be detokenized, or the like.

In step 305, the computing device may determine whether permissions are adequate to provide the original value(s) of the one or more tokenized data elements. This process may involve various forms of authentication to confirm that a user of the user device that requested the original value(s) has the appropriate permission(s) to access the original value(s). For example, the computing device may determine whether a user of the user device has adequate permissions to access the original value of the tokenized first data element. If the permissions are adequate, the method 300 proceeds to step 306. Otherwise, the method proceeds to step 307.

In step 306, the computing device may provide the original value(s) of the one or more tokenized data elements. This process may be the same or similar as step 303, except that the original value(s) may be provided. In some cases, step 306 may involve replacing display of one or more tokenized data elements with their corresponding original values. For example, the computing device may, based on the request for the original value of the tokenized first data element, and based on determining that a user of the user device has adequate permissions to access the original value of the tokenized first data element, cause display, on the user interface of the user device, of the original value of the tokenized first data element and the second data element by transmitting second data comprising the original value of the tokenized first data element and the second data element. The original value(s) of the one or more tokenized data elements may be provided in manners that ensure security of those values. For example, the original values may be displayed for a temporary period of time, may be displayed using a manner that prevents easy copying of the values (e.g., that prevents the copy-and-paste functionality of an operating system), or the like.

In step 307, the computing device may log the request to access (and/or the attempt to access) the original value(s) of the one or more tokenized data elements. This logging step may comprise adding, to a log, an indication (e.g., a log entry indicating) that a user attempted to access particular data, a particular category of data, or the like. For example, the computing device may generate a log entry that reflects access, by the user and the user device, to the original value of the tokenized first data element. An example of such a log is discussed below with respect to FIG. 5.

The logging performed in step 308 may also be performed when users are denied access to the original form of tokenized data (e.g., the "N" arrow from step 305 of FIG. 3). For example, the computing device may receive, from the user device, a request for an original value of a tokenized third data element associated with a first data category. In that example, the computing device may, based on determining that the user of the user device does not have adequate permissions to access the original value of the tokenized first data element, generate a second log entry that reflects attempted access, by the user and the user device, to the original value of the tokenized third data element. Such log entries may be equally valuable to an organization as log entries showing successful access to the data: after all, both may evince (in different ways) possible malicious attempts at collecting personal and/or private information.

In step 308, the computing device may determine whether one or more logs indicate a pattern of access to tokenized data. For example, the computing device may analyze the log entry and one or more other log entries corresponding to the first data category. If there is such a pattern of access, the method 300 proceeds to step 308. Otherwise, the method 300 ends.

The pattern of access may indicate a variety of issues relating to the tokenized data. For instance, in circumstances where a large quantity of data (e.g., all or nearly all credit cards of users) are requested to be detokenized, such a pattern of access might indicate an attempt to maliciously collect and exfiltrate that data. As another example, in circumstances where organization employees begin to access data in a manner that does not appear related to their job, such an unusual pattern of access may indicate that the user is abusing their access privileges.

Determining whether the one or more logs indicate a pattern of access to the tokenized data may comprise use of a trained machine learning model. A trained machine learning model configured to identify patterns of access may be generated by training, using training data, an artificial neural network, such as that described above with respect to FIG. 2. In this manner, the trained machine learning model may be trained to identify patterns of access to tokenized data. The training data may comprise logs (e.g., the logs discussed with respect to step 307) and/or any other data indicating a history of access to tokenized data. The training data may be tagged (e.g., with indications of which portions of the data indicate patterns versus those which do not) and/or untagged (e.g., such that, during the training process, the artificial neural network is configured to identify patterns on its own). Then, as part of step 308, the computing device may provide all or portions of the logs as input data to the trained machine learning model, which may then provide as output an indication of one or more patterns of access to the tokenized data.

Moreover, a machine learning model may be used to identify whether one or more specific patterns of access are malicious. A trained machine learning model configured to identify whether patterns of access are malicious may be generated by training, using training data, an artificial neural network, such as that described above with respect to FIG. 2. The training data may comprise indications of whether or not certain patterns of activity (e.g., certain patterns of access to original forms of tokenized data) indicate malicious activity or are expected. In some cases, that training data may be tagged with indications of maliciousness. Then, as part of step 308, the computing device may provide one or more indications of patterns of access to the trained machine learning model, which may then provide as output an indication of whether those patterns of access are malicious.

A pattern of access may comprise any pattern relating to access to a particular tokenized data element (e.g., a particular user's social security number), a data category (e.g., access to multiple users'social security numbers), or any other subset of the data (e.g., requests for data corresponding to customers in a particular region) or timing of data requests (e.g., a pattern of access to data outside of business hours). In this manner, the pattern of access may be indicative of malicious activity, such as an attempt to collect data for exfiltration purposes.

In step 309, the computing device may output a notification. The notification may relate to the pattern of access identified in step 308. For example, the computing device may, based on the log entry and one or more other log entries corresponding to the first data category, cause output of a notification that indicates a pattern of access to the first data category. Such a notification may warn a recipient about the pattern of access and, in some cases, may provide additional details (e.g., all or portions of the logs, such as an identification of a user that is frequently requesting detokenized PII).

The computing device may output the notification based on a wide variety of log entries relating to access to data. In this manner, the notification need not be based on a single user's request for detokenized data, but might instead relate to a pattern of access by a wide variety of users over a period of time. For example, the one or more other log entries corresponding to the first data category may indicate access, to data corresponding to the first data category, by one or more second users of one or more second user devices.

The notification may be output based on an increase in access to data of a particular category. For example, the computing device may determine, based on the log entry and the one or more other log entries, an increase in access to data of the first data category. In that example, the notification may indicate the increase in access to data of the first data category. This may allow users to identify circumstances where a particular type of data is being collected at an unusual rate. For instance, the pattern of access might indicate that various user accounts (potentially compromised) are periodically but regularly requesting the credit card numbers of each customer over a period of time, suggesting that those user accounts are attempting to collect all credit card numbers of all customers. To determine the increase in access to the data of the first data category, the computing device may be configured to determine an ordinary frequency of access to data of the first data category. To determine the ordinary frequency of access, the computing device may process the log entries. Additionally and/or alternatively, the computing device may, to determine the frequency of access, determine a role of the user. For instance, if the user works as a mortgage issuer, it may be very normal for them to regularly access customer addresses, phone numbers, and the like. That said, if the user works as a salesperson, then it may be relatively unusual for the user to access full credit card numbers.

The notification may be output based on access limits associated with data. Users of the system described herein may be limited in terms of how many times they can detokenize data, and the notification may be based on their attempts (successful or not) to exceed that limit. For example, the computing device may determine, based on a permissions level corresponding to the user of the user device, an access limit, for the user, corresponding to the first data category and determine, based on the log entry and the one or more other log entries, that the user exceeded the access limit. In that example, the notification may indicate that the user exceeded the access limit. In this way, an administrator might be able to quickly identify a compromised account because, for example, it has unusually exceeded its detokenization limits during an attempt to collect data from the database.

The notification may be configured to receive input that causes one or more security settings to be modified. For example, the notification may comprise a button that, when selected, blocks one or more users from accessing the database (or some subset of the database, such as original versions of tokenized data). As another example, the notification may comprise a button that, when selected, changes an existing tokenization algorithm for a data category to a new tokenization algorithm. In such an example, the computing device may then detokenize and retokenize data associated with the data category based on the new tokenization algorithm.

FIG. 4 depicts an example of a database 400 indicating tokens and corresponding original values for different types of data categories. Specifically, the database 400 shows three rows for a user: a first row 401 indicating that the user's social security number "123-456-789" corresponds to the token "a7c2HJJ1," a second row 402 indicating that the messaging preference for the user is "E-mail," and a third row 403 showing that the credit card number for the user, "1234-5678-9101-1121," corresponds to the token "1111-1111-1111-1111." The database 400 thereby illustrates that a wide variety of different categories of data might be tokenized, but not all categories of data need be tokenized. Moreover, the database 400 illustrates that different categories of data might be tokenized in different ways: some (like the social security number in the first row 401) may be tokenized using an arbitrary string with no similarity to the original data, whereas others (like the credit card number in the third row 403) may be tokenized using a string that somewhat mirrors the structure of the original data. A database like the database 400 may be generated through steps such as step 301 of FIG. 3.

FIG. 5 depicts an example of an access log 500 for tokenized data. As detailed with respect to step 307 of FIG. 3, a log may be maintained indicating attempts to access (e.g., granted or denied access) to the original value of a token. For example, every time a user requests access to an original value of a token, then a log entry may be added to the access log 500. The access log 500 shows four rows: a first row 501 indicating that User01 accessed a credit card number on Monday, a second row 502 indicating that User02 accessed an E-mail Address on Monday, a third row 503 indicating that User01 accessed a credit card number on Monday, and a fourth row 504 indicating that User01 accessed a credit card number on Tuesday. This access log 500 may be usable to identify various undesirable activities. For example, if User01 normally does not need access to credit cards for the purposes of their job, then the entries in the access log 500 may be indicative of various issues (e.g., malicious behavior on the part of the user and/or the possibility that a malicious actor has gained access to the user's account).

Figure 6:
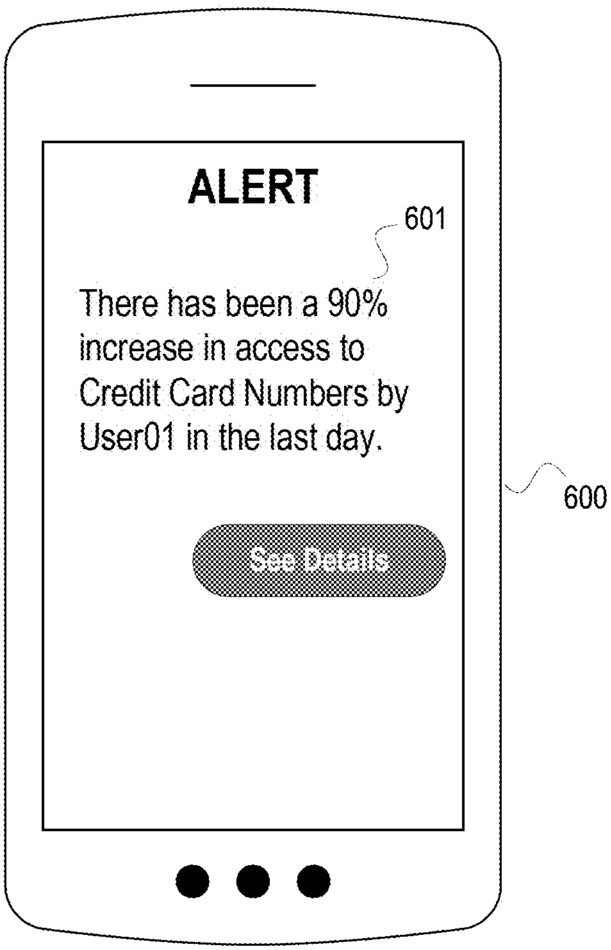
FIG. 6 depicts a notification relating to a pattern of access to tokenized data.

FIG. 6 depicts an example of a notification 601 relating to a pattern of access to tokenized data as displayed on a computing device 600. The computing device 600 may be the same or similar as any of the computing devices discussed above with respect to, for example, FIG. 1. The notification 601 indicates that there has a 90% increase in access to credit card numbers by a particular user. In some cases, such a notification may be innocuous: for example, if the user has to access a large quantity of credit card numbers as part of a yearly review process, then such access might be normal and expected. That said, in other cases, such an uptick in access may indicate malicious activity, such as the possibility that a user account is compromised.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device configured to limit and track access to tokenized data, the computing device comprising:
- one or more processors; and
- memory storing instructions that, when executed by the one or more processors, cause the computing device to:
  - based on determining that a first data element is associated with a security level that satisfies a threshold, store, in a database, an original value of the first data element and a tokenized first data element generated by tokenizing the first data element, wherein the first data element is associated with a first data category;
  - receive, from a user device, a request for data comprising the first data element and a second data element, wherein the second data element is associated with a second data category different from the first data category;
  - cause display, on a user interface of the user device and in response to the request for data, of the tokenized first data element and the second data element by transmitting, to the user device, the tokenized first data element and the second data element;
  - receive, from the user device, a request for the original value of the tokenized first data element;
  - based on the request for the original value of the tokenized first data element, and based on determining that a user of the user device has adequate permissions to access the original value of the tokenized first data element:
    - cause display, on the user interface of the user device, of the original value of the tokenized first data element and the second data element by transmitting second data comprising the original value of the tokenized first data element and the second data element; and
    - generate a log entry that reflects access, by the user and the user device, to the original value of the tokenized first data element; and
  - based on the log entry and one or more other log entries corresponding to the first data category;
    - determine, based on a permissions level corresponding to the user of the user device, an access limit, for the user, corresponding to the original value of the first data element;
    - determine, based on the log entry and the one or more other log entries, that the user exceeded the access limit; and
    - cause output of a notification that indicates that the user exceeded the access limit.

2. The computing device of claim 1, wherein the instructions, when executed by the one or more processors, cause the computing device to cause the output of the notification that indicates that the user exceeded the access limit by causing the computing device to:
- determine, based on the log entry and the one or more other log entries, an increase in access to data of the first data category, wherein the notification indicates the increase in access to data of the first data category.

3. The computing device of claim 1, wherein the instructions, when executed by the one or more processors, cause the computing device to receive the request for the original value of the tokenized first data element in response to the user of the user device interacting with the tokenized first data element in the user interface.

4. The computing device of claim 1, wherein the instructions, when executed by the one or more processors, cause the computing device to store, in the database, the tokenized first data element by causing the computing device to:

determine a tokenization algorithm corresponding to the first data category; and generate the tokenized first data element by processing the first data element in accordance with the tokenization algorithm.

5. The computing device of claim 1, wherein the instructions, when executed by the one or more processors, cause the computing device to:

receive, from the user device, a request for an original value of a tokenized third data element, wherein the tokenized third data element is associated with the first data category; and based on determining that the user of the user device does not have adequate permissions to access the original value of the tokenized third data element, generate a second log entry that reflects attempted access, by the user and the user device, to the original value of the tokenized third data element.

6. The computing device of claim 1, wherein the one or more other log entries corresponding to the first data category correspond to access, to data corresponding to the first data category, by one or more second users of one or more second user devices.

7. The computing device of claim 1, wherein the instructions, when executed by the one or more processors, cause the computing device to determine that the user exceeded the access limit by causing the computing device to:

provide the log entry and the one or more other log entries as input to a trained machine learning model; and receive, as output from the trained machine learning model, an indication that the user exceeded the access limit.

8. A method for limiting and tracking access to tokenized data, the method comprising:

based on determining that a first data element is associated with a security level that satisfies a threshold, storing, in a database, an original value of the first data element and a tokenized first data element generated by tokenizing the first data element, wherein the first data element is associated with a first data category;

receiving, from a user device, a request for data comprising the first data element and a second data element, wherein the second data element is associated with a second data category different from the first data category;

causing display, on a user interface of the user device and in response to the request for data, of the tokenized first data element and the second data element by transmitting, to the user device, the tokenized first data element and the second data element;

receiving, from the user device, a request for the original value of the tokenized first data element;

based on the request for the original value of the tokenized first data element, and based on determining that a user of the user device has adequate permissions to access the original value of the tokenized first data element:

causing display, on the user interface of the user device, of the original value of the tokenized first data element and the second data element by transmitting second data comprising the original value of the tokenized first data element and the second data element; and generating a log entry that reflects access, by the user and the user device, to the original value of the tokenized first data element; and based on the log entry and one or more other log entries corresponding to the first data category;

determining, based on a permissions level corresponding to the user of the user device, an access limit, for the user, corresponding to the original value of the first data element;

determining, based on the log entry and the one or more other log entries, that the user exceeded the access limit; and causing output of a notification that indicates that the user exceeded the access limit.

9. The method of claim 8, wherein the causing the output of the notification that indicates that the user exceeded the access limit comprises:

determining, based on the log entry and the one or more other log entries, an increase in access to data of the first data category, wherein the notification indicates the increase in access to data of the first data category.

10. The method of claim 8, wherein the receiving the request for the original value of the tokenized first data element is in response to the user of the user device interacting with the tokenized first data element in the user interface.

11. The method of claim 8, wherein the storing, in the database, the tokenized first data element comprises:

determining a tokenization algorithm corresponding to the first data category; and generating the tokenized first data element by processing the first data element in accordance with the tokenization algorithm.

12. The method of claim 8, further comprising:

receiving, from the user device, a request for an original value of a tokenized third data element, wherein the tokenized third data element is associated with a first data category; and based on determining that the user of the user device does not have adequate permissions to access the original value of the tokenized first data element, generating a second log entry that reflects attempted access, by the user and the user device, to the original value of the tokenized third data element.

13. The method of claim 8, wherein the one or more other log entries corresponding to the first data category correspond to access, to data corresponding to the first data category, by one or more second users of one or more second user devices.

14. The method of claim 8, wherein the determining that the user exceeded the access limit comprises:

providing the log entry and the one or more other log entries as input to a trained machine learning model; and receiving, as output from the trained machine learning model, an indication that the user exceeded the access limit.

15. One or more non-transitory computer-readable media storing instructions that, when executed by one or more processors of a computing device, cause the computing device to limit and track access to tokenized data by causing the computing device to:

based on determining that a first data element is associated with a security level that satisfies a threshold, store, in a database, an original value of the first data element and a tokenized first data element generated by tokenizing the first data element, wherein the first data element is associated with a first data category;

receive, from a user device, a request for data comprising the first data element and a second data element, wherein the second data element is associated with a second data category different from the first data category;

cause display, on a user interface of the user device and in response to the request for data, of the tokenized first data element and the second data element by transmitting, to the user device, the tokenized first data element and the second data element;

receive, from the user device, a request for the original value of the tokenized first data element;

based on the request for the original value of the tokenized first data element, and based on determining that a user of the user device has adequate permissions to access the original value of the tokenized first data element:

cause display, on the user interface of the user device, of the original value of the tokenized first data element and the second data element by transmitting second data comprising the original value of the tokenized first data element and the second data element; and generate a log entry that reflects access, by the user and the user device, to the original value of the tokenized first data element; and based on the log entry and one or more other log entries corresponding to the first data category;

determine, based on a permissions level corresponding to the user of the user device, an access limit, for the user, corresponding to the original value of the first data element;

determine, based on the log entry and the one or more other log entries, that the user exceeded the access limit; and cause output of a notification that indicates that the user exceeded the access limit.

16. The one or more non-transitory computer-readable media of claim 15, wherein the instructions, when executed by the one or more processors, cause the computing device to cause the output of the notification that indicates that the user exceeded the access limit by causing the computing device to:

determine, based on the log entry and the one or more other log entries, an increase in access to data of the first data category, wherein the notification indicates the increase in access to data of the first data category.

17. The one or more non-transitory computer-readable media of claim 15, wherein the instructions, when executed by the one or more processors, cause the computing device to receive the request for the original value of the tokenized first data element in response to the user of the user device interacting with the tokenized first data element in the user interface.

18. The one or more non-transitory computer-readable media of claim 15, wherein the instructions, when executed by the one or more processors, cause the computing device to store, in the database, the tokenized first data element by causing the computing device to:

determine a tokenization algorithm corresponding to the first data category; and generate the tokenized first data element by processing the first data element in accordance with the tokenization algorithm.

19. The one or more non-transitory computer-readable media of claim 15, wherein the instructions, when executed by the one or more processors, cause the computing device to:

receive, from the user device, a request for an original value of a tokenized third data element, wherein the tokenized third data element is associated with a first data category; and based on determining that the user of the user device does not have adequate permissions to access the original value of the tokenized first data element, generate a second log entry that reflects attempted access, by the user and the user device, to the original value of the tokenized third data element.

20. The one or more non-transitory computer-readable media of claim 15, wherein the instructions, when executed by the one or more processors, cause the computing device to determine that the user exceeded the access limit by causing the computing device to:

provide the log entry and the one or more other log entries as input to a trained machine learning model; and receive, as output from the trained machine learning model, an indication that the user exceeded the access limit.

* * * * *